(12) United States Patent
Villela et al.

(10) Patent No.: US 6,712,590 B1
(45) Date of Patent: Mar. 30, 2004

(54) FUEL DRAWING DEVICE FOR MOTOR VEHICLE TANK

(75) Inventors: Frédérico Villela, Chalons en Champagne (FR); Anne Stathopoulus, Fagniere (FR)

(73) Assignee: Marwal Systems, Chalons en Champagne (FR)

( * ) Notice: Subject to any disclaimer, the term of this patent is extended or adjusted under 35 U.S.C. 154(b) by 272 days.

(21) Appl. No.: 09/831,295

(22) PCT Filed: Sep. 6, 2000

(86) PCT No.: PCT/FR00/02450

§ 371 (c)(1), (2), (4) Date: Jul. 27, 2001

(87) PCT Pub. No.: WO01/18380

PCT Pub. Date: Mar. 15, 2001

(30) Foreign Application Priority Data

Sep. 7, 1999 (FR) ............................................. 99 11172

(51) Int. Cl.[7] .............................................. F04B 17/00
(52) U.S. Cl. ................................. 417/423.9; 417/423.3; 123/509
(58) Field of Search ........................... 417/423.9, 423.3; 123/509

(56) References Cited

U.S. PATENT DOCUMENTS

| 4,834,132 A | * | 5/1989 | Sasaki et al. ............... 137/143 |
| 5,392,750 A | * | 2/1995 | Laue et al. .................. 123/509 |
| 6,113,354 A | * | 9/2000 | Meese et al. ............ 417/199.1 |

* cited by examiner

Primary Examiner—Thor Campbell
(74) Attorney, Agent, or Firm—Blakely, Sokoloff, Taylor & Zafman

(57) ABSTRACT

A device for drawing fuel for a motor vehicle tank, the device comprising a drawing pump (100) and a fine filter (210) placed upstream from the pump (100), and wherein: the housing (200) of the filter possesses a degassing orifice (222) in the top portion thereof; the drawing pump (100) also possesses a degassing orifice (130); and the filter housing (200) is fitted with a duct (224) which extends the degassing orifice (222) of the housing (200), opens out into a cavity (220) common to the degassing orifice of the pump (100), and possesses a mouth (227) situated at a height that is equal to or lower than that of the degassing orifice (130) of the pump (100), said duct (224) being shaped so as to constitute a siphon suitable for conveying fuel around the mouth (227) to the inside of the filter housing (200) while the drawing pump (100) is being stopped.

31 Claims, 3 Drawing Sheets

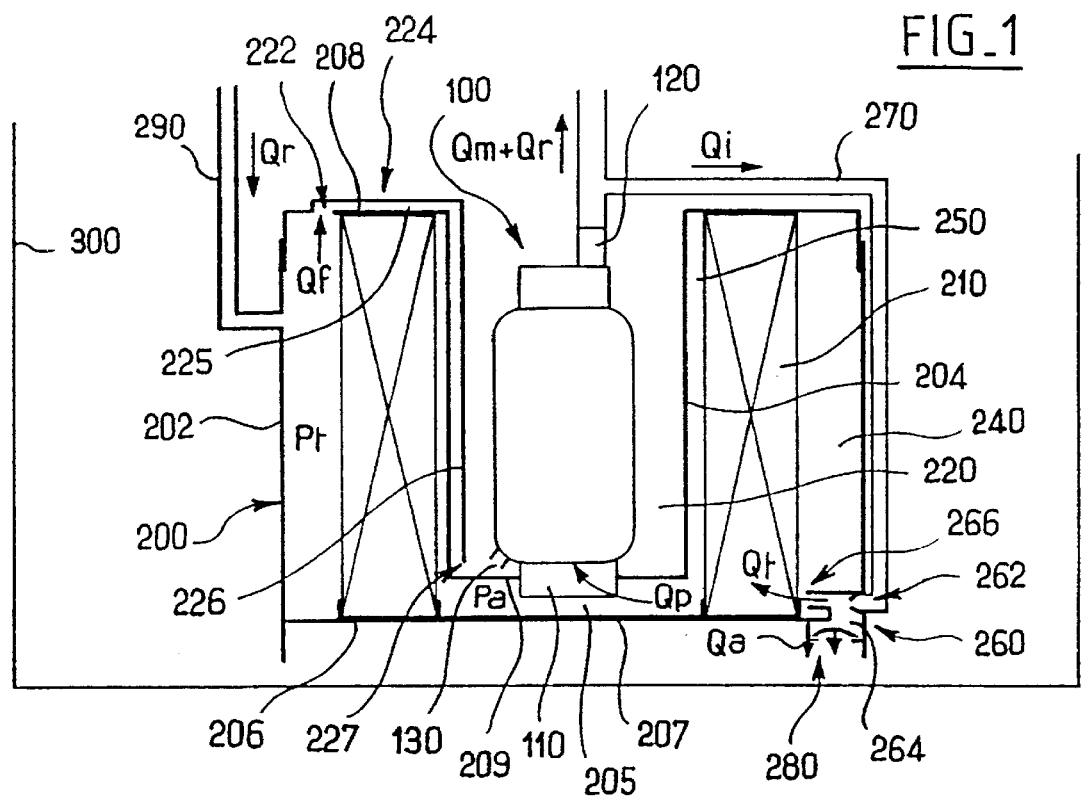
FIG_1
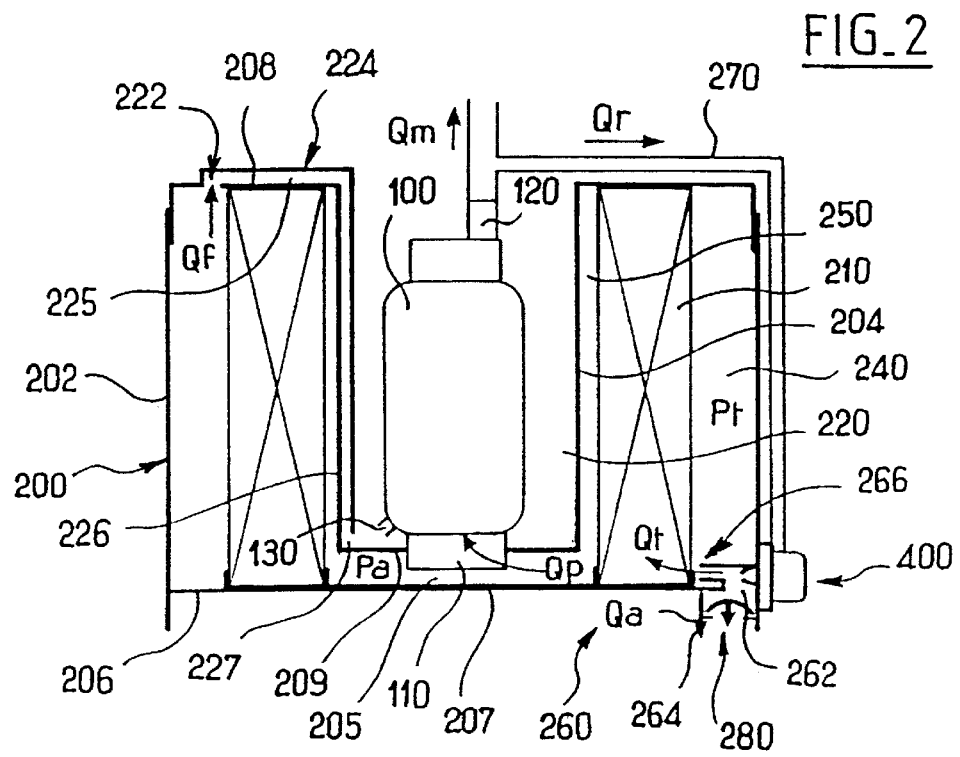
FIG_2

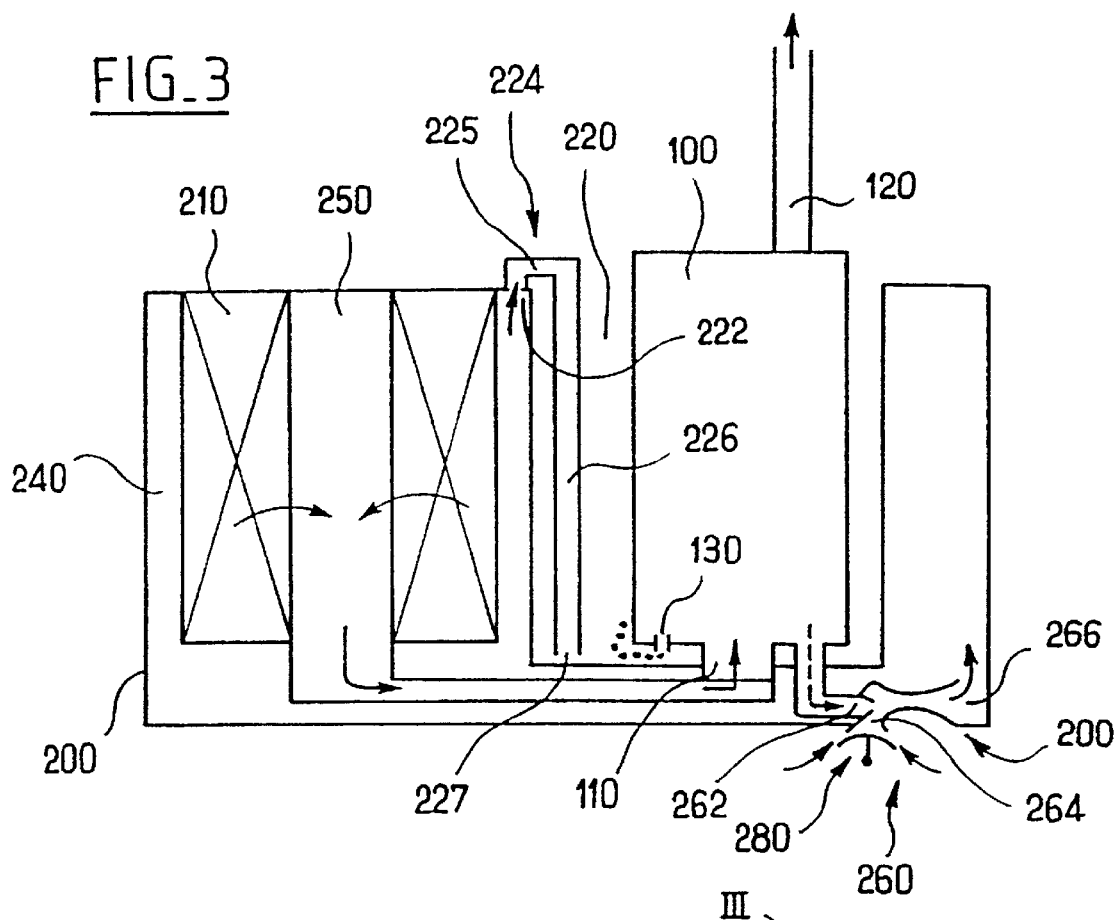
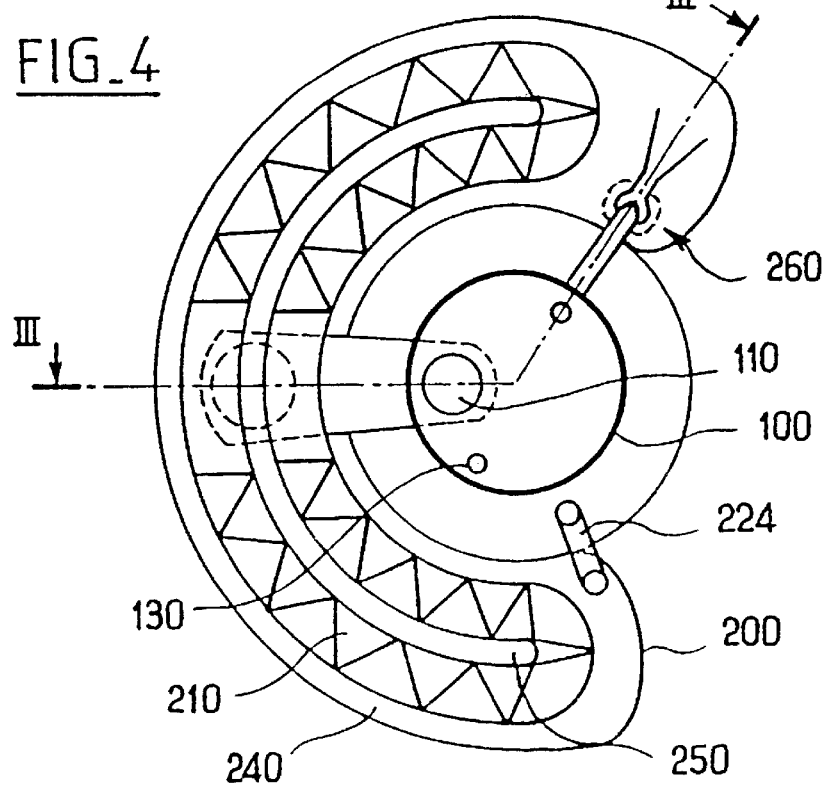

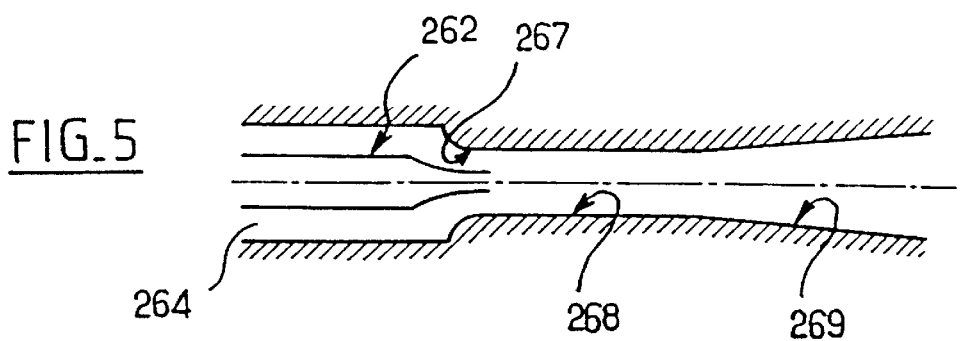
FIG_5
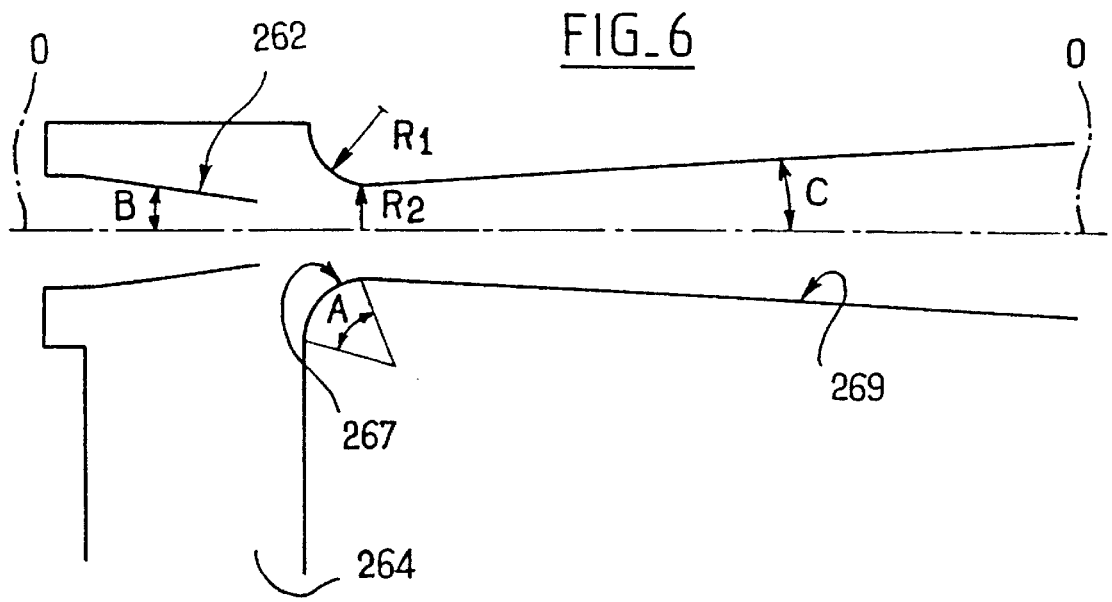
FIG_6
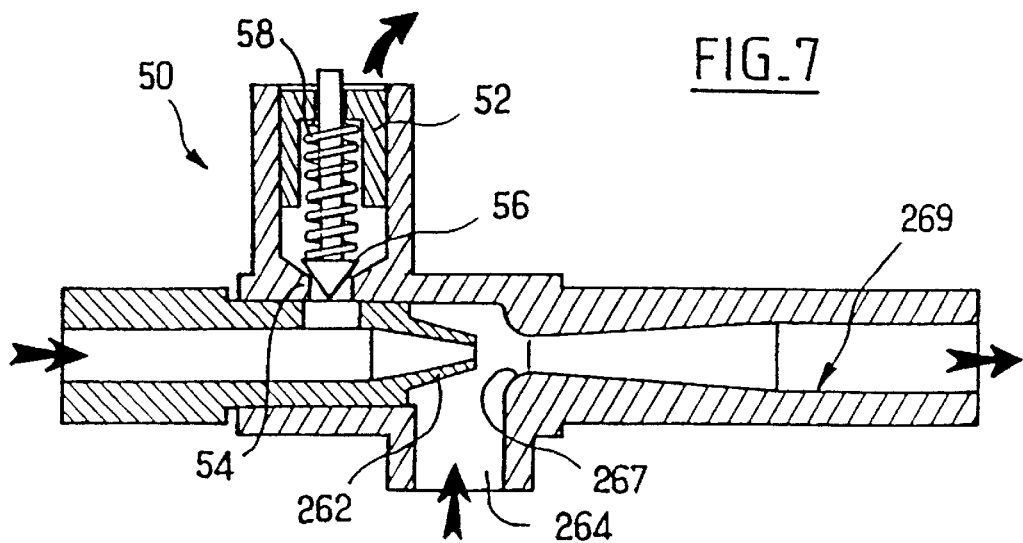
FIG_7

FUEL DRAWING DEVICE FOR MOTOR VEHICLE TANK

The present invention relates to the field of systems for drawing fuel from a motor vehicle tank.

Numerous systems have been proposed for this purpose.

In general, systems for drawing fuel from a motor vehicle tank comprise an electric pump which sucks in fuel from the tank or from a reserve situated in the tank.

The purpose of such a reserve is to limit variations in fuel level at the inlet of the pump, as can result from accelerations, decelerations, or centrifugal forces when the vehicle is traveling along a curved path.

Furthermore, known drawing systems generally comprise a coarse filter or strainer placed at the pump inlet, and a fine filter for guaranteeing the quality of the fuel that is sent to the engine.

Proposals have been made in particular for fuel-drawing systems in which the fine filter is situated downstream from the electric pump, e.g. as described in document WO-A-99/01658.

Known drawing systems have already given good service.

However, they do not give full satisfaction.

In particular, in spite of a great deal of research, it has not yet been possible to provide a proper solution to the various requirements for development that make themselves felt in the automotive industry.

Firstly, it should be observed that when the fine filter is situated downstream from the pump, i.e. on its outlet duct, the fine filter is placed under pressure so its housing must present mechanical strength suitable for being stressed by said pressure.

That has led to a desire for the fine filter to be located not downstream from the pump but upstream therefrom, e.g. at its inlet. That would enable stresses on the housing for the fine filter to be reduced and, in some cases, might even make it possible to omit the inlet strainer.

However, placing the fine filter upstream from the pump gives rise to a problem that has not yet been solved in satisfactory manner: when the system is first started, or after it has lost priming, or when fuel levels are low, if the fine filter is situated upstream from the pump, then the electric pump must also suck in a large volume of air corresponding substantially to the volume of the housing for the fine filter.

Secondly, it should be observed that until now most electric pumps used in fuel-drawing systems are of the rotary gear pump type. Such pumps operate on the principle of sucking liquid into the space that lies between two consecutive teeth and in then causing the liquid to travel into a delivery section.

However, at present, there is strong demand for rotary gear pumps to be replaced by turbine or centrifugal pumps since they present genuine advantages. Turbine or centrifugal pumps are machines in which rotation of a wheel or rotor produces pressure and speed conditions which cause a liquid to flow in a circuit, with the magnitude of the flow rate being the result of equilibrium between the working energy per unit mass delivered by the pump and the resistive energy per unit mass of the circuit.

Nevertheless, at present, in numerous configurations, attempts at using turbine pumps or centrifugal pumps for drawing fuel have not given satisfaction because of the priming problems that are inherent to pumps of those types. This problem is particularly acute for systems in which the fine filter is situated upstream from the pump because of the head loss that the filter generates.

Thirdly, it should be emphasized that turbine pumps or centrifugal pumps generally possess a degassing orifice. The presence of such a degassing orifice through the casing of the pump leads to a risk, when the pump is not in operation, not only of contaminating the pump's own internal volume, but also of contaminating at least a portion of the volume of the housing for the fine filter connected thereto.

Fourthly, it should be emphasized that the presence of the degassing orifice in the casing of the pump can lead to a risk of the positive reserve associated with the pump being emptied via said degassing orifice, unless special precautions are taken.

An object of the present invention is to improve known fuel-drawing systems in order to eliminate the above-mentioned drawbacks inherent to the prior art.

In the context of the present invention, this object is achieved by a device for drawing fuel for a motor vehicle tank, the device comprising a drawing pump and a fine filter placed upstream from the pump, and being characterized by the facts that:

the housing of the filter possesses a degassing orifice in the top portion thereof;

the drawing pump also possesses a degassing orifice; and the filter housing is fitted with a duct which extends the degassing orifice of the housing, opens out into a cavity common to the degassing orifice of the pump, and possesses a mouth situated at a height that is equal to or lower than that of the degassing orifice of the pump, said duct being shaped so as to constitute a siphon suitable for conveying fuel around the mouth to the inside of the filter housing while the drawing pump is being stopped.

According to an advantageous characteristic of the present invention, the inlet chamber of the filter housing is fed and pressurized by means of a jet pump, thus making it possible to pressurize the inlet stage of the filter so as to assist the pump in its suction process.

Other characteristics, objects, and advantages of the invention will appear on reading the following detailed description, and on observing the accompanying drawings which are given as non-limiting examples, and in which:

FIG. 1 is a diagrammatic vertical section view through a drawing device constituting a first embodiment of the present invention;

FIG. 2 is a similar vertical section view through a device constituting a second embodiment of the present invention;

FIG. 3 is a similar vertical section view through a third embodiment of the present invention, on non-coplanar planes referenced 3—3 in FIG. 4;

FIG. 4 is a horizontal cross-section view of the FIG. 3 device;

FIG. 5 is a diagrammatic longitudinal axial section view of a conventional jet pump of the prior art;

FIG. 6 is a diagrammatic longitudinal axial section view of jet pump of the present invention; and FIG. 7 is a diagrammatic longitudinal axial section view of a jet pump constituting a preferred embodiment of the present invention.

The description begins with the embodiment shown in accompanying FIG. 1.

FIG. 1 shows a vertical axis pump 100. Most preferably, this is a pump of the turbine or centrifugal type. As mentioned above, such a turbine or centrifugal pump possesses a wheel or rotor adapted to produce pressure and speed conditions that cause fuel to flow in a circuit.

The inlet 110 of the pump 100 is placed at the bottom end of the pump. The outlet 120 is situated at the top end of the pump.

The pump 100 possesses a degassing orifice 130 which opens to the outside of the pump casing and which is situated in the vicinity of the bottom portion of the pump 100, substantially above the inlet orifice 110.

Accompanying FIG. 1 also shows a filter housing 200 that is generally in the form of a ring centered on a vertical axis.

The housing 200 is essentially defined by a radially outer cylindrical wall 202, a radially inner cylindrical wall 204 coaxial with the above-mentioned wall 202, and two generally horizontal partitions 206 and 208 in the form of rings respectively defining the bottom and top portions of the housing 200.

The ring 208 is connected in leakproof manner to the top edges of the two cylindrical partitions 202 and 204.

The ring 206 is also connected to the bottom edge of the outer cylindrical partition 202. In contrast, as described in greater detail below, it is not connected to the bottom of the radially inner cylindrical wall 204.

The housing 200 houses a filter 210 of annular shape. Nevertheless, as explained below in particular with reference to FIGS. 3 and 4, the housing 200 and the filter 210 could be of other shapes.

In FIG. 1, the pump 100 is placed in the central cavity 220 of the filter housing 200, i.e. in the cavity defined on the inside of the radially inner wall 204.

Respective leakproof connections are defined between each of the two ring-shaped walls 206 and 208 of the housing 200 and the bottom and top portions respectively of the filter 210.

Thus, the housing 200 defines two chambers 240 and 250 which are respectively radially on the inside and radially on the outside of the filter 210.

The radially outer chamber 240 serves as an inlet chamber for the housing 200.

The radially inner chamber 250 serves as an outlet chamber.

For this purpose, the ring-shaped bottom wall 206 in the central portion of the housing 200 is extended by a leakproof partition 207 while the radially inner cylindrical wall 204 which defines the outlet chamber 250 and which is interrupted before the partition 207 is extended by a horizontal wall 209 parallel to the above-mentioned partition 207.

The two partitions 207 and 209 thus define a cylindrical chamber 205 which communicates with the outlet chamber 250 of the filter housing. The inlet 110 of the pump opens out into this chamber 205. The partition 209 also surrounds the inlet 110 of the pump in leakproof manner.

The inlet chamber 240 of the filter housing can be filled by any suitable means from the tank 300.

The inlet chamber 240 is preferably filled by means of a jet pump 260 whose general structure is known per se.

The jet pump 260 possesses a converging nozzle 262 forming a driving Venturi which is fed with fuel, for example, from a branch connection 270 leading from the outlet of the pump 100. The jet pump 260 also has an inlet 264 for a sucked-in flow, which inlet is in the bottom portion thereof and is protected by a valve member 280, e.g. an umbrella-shaped member that is directed in such a manner as to allow fuel to be transferred from the tank 300 into the internal chamber of the jet pump 260 and then to the inlet chamber 240, while preventing fuel from flowing in the opposite direction, i.e. from the inlet stage 240 and the internal volume of the jet pump 260 into the tank 300.

Finally, the jet pump 260 possesses a delivery outlet 266 which opens out into the inlet chamber 240 of the filter housing 200.

In a variant embodiment, the delivery outlet 266 of the jet pump 260 can be extended by a vertical pipe whose top end is situated in the vicinity of the top of the housing 200. Under such circumstances, there is no need to put a non-return valve 280 on the suction flow inlet 264. Nevertheless, such a valve can still be used at some arbitrary point of the bottom wall of the housing 200 defining the inlet chamber 240 so as to allow fuel to be transferred from the tank-to the inlet chamber 240 whenever the level of fuel in the tank 300 is higher than that in the inlet chamber 240.

It will also be observed that in the embodiment shown in FIG. 1 the flow of fuel Qr that is not consumed by the engine is returned via a duct 290 to the inlet chamber 240 of the filter.

Nevertheless, in a variant, this flow Qr from the duct 290 could be used for driving the jet pump 260, and more precisely the converging nozzle thereof forming the driving Venturi 262.

In yet another variant embodiment, the return flow Qr and the branch flow Qi taken from the outlet of the pump 10 to feed the driving Venturi 262 of the jet pump 260 could be used in common for the purpose of filling the inlet chamber 240 of the filter.

The flow of fuel Qp sucked in through the inlet 110 of the pump 100 is equal to the sum of the flows Qm+Qr+Qi delivered via the outlet 120.

The flow Qt from the outlet 266 of the jet pump 260 is equal to the sum of the flow Qi coming from the branch 270 and the flow Qa coming from the inlet 264.

To enable the filter housing 200 to be filled, the sum of the delivery flow rate Qr and the flow rate Qt from the jet pump 260 must be greater than the rate Qp sucked in via the inlet 110 of the pump plus Qf from the housing 200 via a degassing orifice 222 situated in the top portion of 200, typically through the partition 208.

As can be seen on examining FIG. 1, the degassing orifice 130 of the pump 100 opens out into the central cavity 220 defined by the radially inner surface 204 of the filter housing 200.

On examining FIG. 1, it should also be observed that the structure of the present invention enables a large positive reserve volume to be provided for the pump 100, which volume is equal to the volume of the housing 200.

As mentioned above, the degassing orifice 222 from the filter housing 200 is placed in the top partition 208 facing the inlet chamber 240.

This orifice 222 opens out into a duct 224 which has a generally horizontal segment 225 running along the top partition 208 and is extended by a generally vertical segment 226 which runs along the radially inner wall 204 down towards the base of the cavity 220. The end segment 226 of the duct 224 thus possesses a mouth 227 situated close to the partition 209 in the vicinity of the degassing orifice 130 of the pump 100.

The mouth 227 of the duct 224 is situated at a height that is equal to or less than the height of the degassing orifice 130 of the pump 100.

The mouth 227 of the duct 224 is preferably situated below the level of the degassing orifice 130 of the pump 100. It is also preferable for the diameter of the duct 124 to be at least slightly greater than the diameter of the degassing orifice 130 of the pump 100.

By means of these characteristics, the duct 224 constitutes a siphon suitable, when the pump 100 is stopped, for taking the fuel present in the central cavity 220 as defined by the pump housing 200 to the inlet chamber 240 of the filter, thus preventing fuel from penetrating into the pump via the degassing orifice 130 since that might contaminate the pump 100.

When the system is filled for the first time, the filter housing 200 is degassed via the orifice 222 and the duct 224 with its two segments 225 and 226. Similarly, the pump 100 is degassed via the orifice 130.

When the pump 100 is stopped, the housing 200 defines a static fuel reserve.

Furthermore, as mentioned above, the duct 224 forms a siphon suitable for sucking the fuel present in the central cavity 220 towards the inlet chamber 240 thus preventing said fuel being sucked towards the inside of the pump 100 via the degassing orifice 130.

It will be observed that the siphon formed by the duct 224 is assisted in this function by the internal pressure that exists inside the pump 100 when it is stopped.

FIG. 2 shows a variant of the present invention which differs from the above-described embodiment shown in FIG. 1 essentially by omitting the return duct 290 and by having a pressure regulator 400 present on the outlet of the pump, more precisely on the branch duct 270 used for feeding the driving Venturi 262 of the jet pump 260.

The pressure regulator 400 is designed to open and allow an outlet flow from the pump 100 to the driving Venturi 262 when the pressure at the outlet of the pump 100 is greater than a threshold, and on the contrary to close and prevent this flow when the outlet pressure of the pump 100 is below said threshold.

The regulator 400 can be implemented in various conventional ways. It is therefore not described in detail below.

Nevertheless, it should be observed that the regulator 400 preferably comprises a housing which houses a flexible diaphragm subjected to thrust firstly from a rated resilient member urging it to bear against an outlet nozzle, and secondly from the pressure of the fuel in the branch duct 270 urging it away from said outlet nozzle.

Thus, when the force generated on the diaphragm by the pressure in the branch duct 270 is greater than the force generated by the rated resilient member, then the flexible diaphragm is lifted away from the outlet nozzle and allows a flow to pass towards the driving Venturi 262, thereby feeding the pump 260.

In contrast, when the force generated on the flexible diaphragm of the pressure regulator 400 by the pressure in the duct 270 is less than the force applied by the rated resilient member, then said diaphragm is pressed against the outlet nozzle to prevent the jet pump 260 being fed.

The embodiment shown in FIGS. 3 and 4 is described below.

Firstly, this variant differs from those described above with reference to FIGS. 1 and 2 by the fact that it has a pump 100 including an integral jet pump 260 whose driving Venturi is fed via a pressure stage of the pump 100 and which is placed to feed the inlet chamber 240 of the filter as described above with reference to FIGS. 1 and 2.

Secondly, this embodiment shown in FIGS. 3 and 4 differs from those described above with reference to FIGS. 1 and 2 by the fact that its filter 210 is not annular, surrounding the pump 100, but is crescent-shaped and is located on one side of the pump 100.

The embodiment shown in FIGS. 3 and 4 reproduces most of the characteristics described above with reference to FIGS. 1 and 2, and in particular a filter inlet chamber 240 fed by means of the jet pump 260 and provided with a degassing orifice 222 which opens out into a siphon-forming duct 224, and a degassing orifice 130 from the pump 100 which is placed in the vicinity of the mouth 227 of the siphon 224.

There follows a description of improvements in accordance with the present invention that are specific to jet pumps 260.

These improvements apply in particular to the embodiment shown in FIGS. 3 and 4.

Accompanying FIG. 5 shows the conventional structure of a jet pump. Such a conventional jet pump, sometimes also referred to as a liquid ejector, is constituted in outline by the following elements all lying on the same axis:

a first converging Venturi 262 referred to the "driving" Venturi which is fed with fluid under pressure;

a second converging Venturi 267 referred to as the "takeup" Venturi which surrounds the first and is connected to a suction inlet 264 of the device;

a cylindrical section 268 referred to as a "mixer"; and an end diverging portion 269 acting as a diffuser.

In general, the throat of the driving Venturi 262 is placed slightly upstream from the throat of the takeup Venturi 267, or level with the throat of said takeup Venturi 267, or level with the connection between the throat of the takeup Venturi 267 and the mixer 268.

The flow feeding the driving Venturi 262 constitutes the driving flow of the ejector. In this Venturi, pressure energy is transformed into kinetic energy. At its outlet, the driving fluid is thus in the form of a high speed jet. By turbulent exchange of momentum, this jet entrains a certain quantity of liquid through the takeup Venturi 267, this quantity constituting the flow sucked in by the ejector. In the mixer 268, the interchange of momentum between the driving and the sucked-in fluids continues and is completed, with the speeds of the two jets progressively becoming equal. In the end diverging portion 269, a fraction of the kinetic energy of the mixture is converted back into pressure energy by diffusion.

Known jet pump devices have already given good service. However they do not always give complete satisfaction.

In particular, the Applicant has observed that known jet pumps do not operate under satisfactory conditions when the back pressure at the outlet from the diffuser 269 is high.

An auxiliary object of the present invention is to provide a novel jet pump enabling the drawbacks of the prior art to be eliminated.

In the context of the present invention, this object is achieved by a jet pump in which the takeup Venturi 267 is connected directly to the diffuser without an intermediate mixer.

According to another advantageous characteristic of the present invention, the jet pump has a large diffuser.

Accompanying FIG. 6 shows a body defining a channel centered on an axis O—O and comprising a first converging Venturi 262 forming a driving Venturi that is fed with fluid under pressure, a second converging Venturi 267 forming a takeup Venturi that surrounds the first and that is connected both to a suction inlet 264 of the device and to an end diverging portion 269 that acts as a diffuser.

As mentioned above, the jet pump of the present invention is thus characterized by the absence of a mixer between the second converging Venturi forming a takeup Venturi 267 and the end diverging portion 269 forming a diffuser.

In the context of the present invention, the driving Venturi 262 is preferably conical in shape, presenting a length that lies in the range 4 millimeters (mm) to 8 mm, and that most advantageously is about the same size as the diameter of the suction inlet 264.

The end forming the outlet nozzle from the throat of the driving Venturi 262 is preferably situated at a distance lying in the range 1 mm to 3 mm from the takeup Venturi.

The angle of convergence B of the driving Venturi 262 preferably lies in the range 0° to 30° and is most advantageously about 5°.

The takeup Venturi 267 is preferably defined by a toroidal cap. The radius of curvature R1 of this toroidal cap 267 preferably lies in the range 1 mm to 2 mm and most advantageously is about 1.6 mm. The radius of curvature R1 of this toroidal cap is preferably tangential to the diffuser 269.

The inside radius R2 of the takeup Venturi 267 at its smallest section preferably lies in the range 1.8 mm to 3.0 mm, and most advantageously is about 2.0 mm to 2.6 mm.

The toroidal envelope of the takeup Venturi 267 preferably covers an angle A lying in the range 30° to 60°, and most advantageously equal to about 45°.

The diffuser-forming end diverging portion 269 is preferably defined by a conical envelope.

The length of the diffuser tube 269 preferably lies in the range 10 mm to 40 mm, and most advantageously is about 18 mm.

The angle of convergence C of the diffuser tube 269 preferably lies in the range 2° to 10° and most advantageously is about 4°.

FIG. 7 shows a variant embodiment in which the body of the jet pump is fitted with a valve 50 that is designed to open in the event of excess pressure inside the driving Venturi 262.

The valve 50 occupies a tube 52 that extends radially relative to the axis O-O and it is connected to the body of the jet pump upstream from the converging Venturi 262 that forms the driving Venturi.

The tube 52 thus defines a chamber which opens out into the driving Venturi 262. More precisely, said chamber defines a valve seat 54 directed radially outwards and having a valve member 56 urged thereagainst by a spring 58.

In the variant shown in FIG. 7, the valve body 56 is generally in the form of a mushroom whose flared head rests on the valve seat 54 while the smaller-section stalk serves to guide the valve member 56 in sliding radially relative to the axis O—O and also serves to hold the spring 58.

Naturally, the valve 50 could be made in a variety of ways.

It is designed to open by the valve member 56 lifting off the valve seat 54 in the event of the pressure in the driving Venturi 262 becoming excessive, and, on the contrary, to reclose when the pressure in the driving Venturi 262 drops below a determined threshold.

Naturally, the present invention is not limited to the particular embodiment described above, but extends to any variant within the spirit of the invention.

What is claimed is:

1. A device for drawing fuel for a motor vehicle tank, the device comprising a drawing pump (100) and a fine filter (210) placed upstream from the pump (100), and being characterized by the facts that: the housing (200) of the filter possesses a degassing orifice (222) in the top portion thereof;

the drawing pump (100) also possesses a degassing orifice (130); and the filter housing (200) is fitted with a duct (224) which extends the degassing orifice (222) of the housing (200), opens out into a cavity (220) common to the degassing orifice of the pump (100), and possesses a mouth (227) situated at a height that is equal to or lower than that of the degassing orifice (130) of the pump (100), said duct (224) being shaped so as to constitute a siphon suitable for conveying fuel around the mouth (227) to the inside of the filter housing (200) while the drawing pump (100) is being stopped.

2. A device according to claim 1, characterized by the fact that the inlet chamber (240) of the filter housing (200) is fed and pressurized by means of a jet pump (260).

3. A device according to claim 1 or claim 2, characterized by the fact that the drawing pump (100) is of the turbine or centrifugal type.

4. A device according to claim 2, characterized by the fact that the jet pump (260) is fed by a branch (270) connected to the outlet (120) of the drawing pump (100).

5. A device according to claim 2, characterized by the fact that the jet pump (260) is fed by a return duct (290) receiving fuel that is not consumed by the engine.

6. A device according to any one of claims 2, 4, and 5, characterized by the fact that the jet pump (260) is fed both by a branch (270) connected to the outlet (120) of the drawing pump (100) and by a return duct (290) which receives fuel that is not consumed by the engine.

7. A device according to claim 2, characterized by the fact that the jet pump (260) has its suction inlet (264) fitted with a non-return valve (280).

8. A device according to claim 2, characterized by the fact that the jet pump (260) has its outlet extended by a vertical tube whose end is situated close to the top of the filter housing (200).

9. A device according to claim 1, characterized by the fact that a return duct (290) receiving the fuel that is not consumed by the engine opens out into the inlet chamber (240) of the filter housing (200).

10. A device according to claim 1, characterized by the fact that the siphon-forming duct (224) possesses a horizontal segment (225) which communicates with the degassing orifice (222) of the filter housing and a generally vertical segment whose bottom mouth (227) is situated in the vicinity of the bottom of a cavity (220) defined by the housing (200) for the fine filter and in which the drawing pump (100) is situated.

11. A device according to claim 1, characterized by the fact that the mouth (227) of the siphon-forming duct (224) is situated beneath the level of the degassing orifice (130) of the drawing pump (100).

12. A device according to claim 1, characterized by the fact that the diameter of the siphon-forming duct (224) is greater than the diameter of the degassing orifice (130) of the drawing pump (100).

13. A device according to claim 1, characterized by the fact that a pressure regulator (400) is placed on a duct (270) connected to the outlet of the drawing pump (100) and to the driving Venturi (262) of a jet pump (260) feeding the inlet chamber (240) of the filter housing.

14. A device according to claim 1, characterized by the fact that a jet pump (260) feeding the inlet chamber (240) of the filter housing is integrated in the casing of the drawing pump (100).

15. A device according to claim 1, characterized by the fact that the filter (210) is annular in shape and surrounds the drawing pump (100).

16. A device according to claim 1, characterized by the fact that the filter (210) is disposed on one side of the drawing pump (100).

17. A device according to claim 1, characterized by the fact that the degassing orifice (222) of the filter housing opens out into the inlet chamber (240) thereof.

18. A device according to claim 1, characterized by the fact that the degassing orifice (130) of the drawing pump (100) is situated in the bottom portion of the casing of the drawing pump (100) in a cavity (220) defined by the filter housing (200).

19. A device according to claim 2, the device being of the type comprising a jet pump having a first converging Venturi forming a driving Venturi (262) which is fed with fluid under pressure, a second converging Venturi forming a takeup Venturi (267) surrounding the first and connected to a suction inlet, and an end diverging portion (269) acting as a diffuser, the device being characterized by the fact that the second converging Venturi (267) forming the takeup Venturi is connected directly to the end diverging portion (269) acting as a diffuser without any intermediate mixer.

20. A device according to claim 19, characterized by the fact that an end forming an outlet nozzle from a throat of the driving Venturi (262) is situated at 1 mm to 3 mm from the takeup Venturi (267).

21. A device according to claim 19, characterized by the fact that the takeup Venturi (267) is defined by a toroidal cap.

22. A device according to claim 21, characterized by the fact that the radius of curvature (Ri) of the toroidal cap (267) lies in the range 1 mm to 2 mm.

23. A device according to claim 21, characterized by the fact that the radius of curvature (Rl) of the toroidal cap (267) is tangential to the Venturi of the diffuser (269).

24. A device according to claim 19, characterized by the fact that the diffuser-forming end diverging portion (269) is defined by a conical envelope.

25. A device according to claim 19, characterized by the fact that an angle of divergence (C) of the diffuser tube (269) lies in the range 2° to 10°.

26. A device according to claim 19, characterized by the fact that internal radius (R2) of the takeup Venturi (267) at its smallest section lies in the range 1.8 mm to 3 mm.

27. A device according to claim 19, characterized by the fact that the length of the diffuser tube (269) lies in the range 10 mm to 14 mm.

28. A device according to claim 19, characterized by the fact that the driving Venturi (262) is conical in shape and presents a length lying in the range 4 mm to 8 mm.

29. A device according to claim 19, characterized by the fact that an angle of convergence (B) of the driving Venturi (262) lies in the range 0° to 30°.

30. A device according to claim 19, characterized by the fact that a toroidal envelope of the takeup Venturi (267) covers an angle (A) lying in the range 30° to 60°.

31. A device according to claim 19, characterized by the fact that the jet pump is fitted with a pressure-release valve (50).

* * * * *